3,402,753
FLUIDIZED MASS PROCESS FOR DESALINATION OF SEA WATER

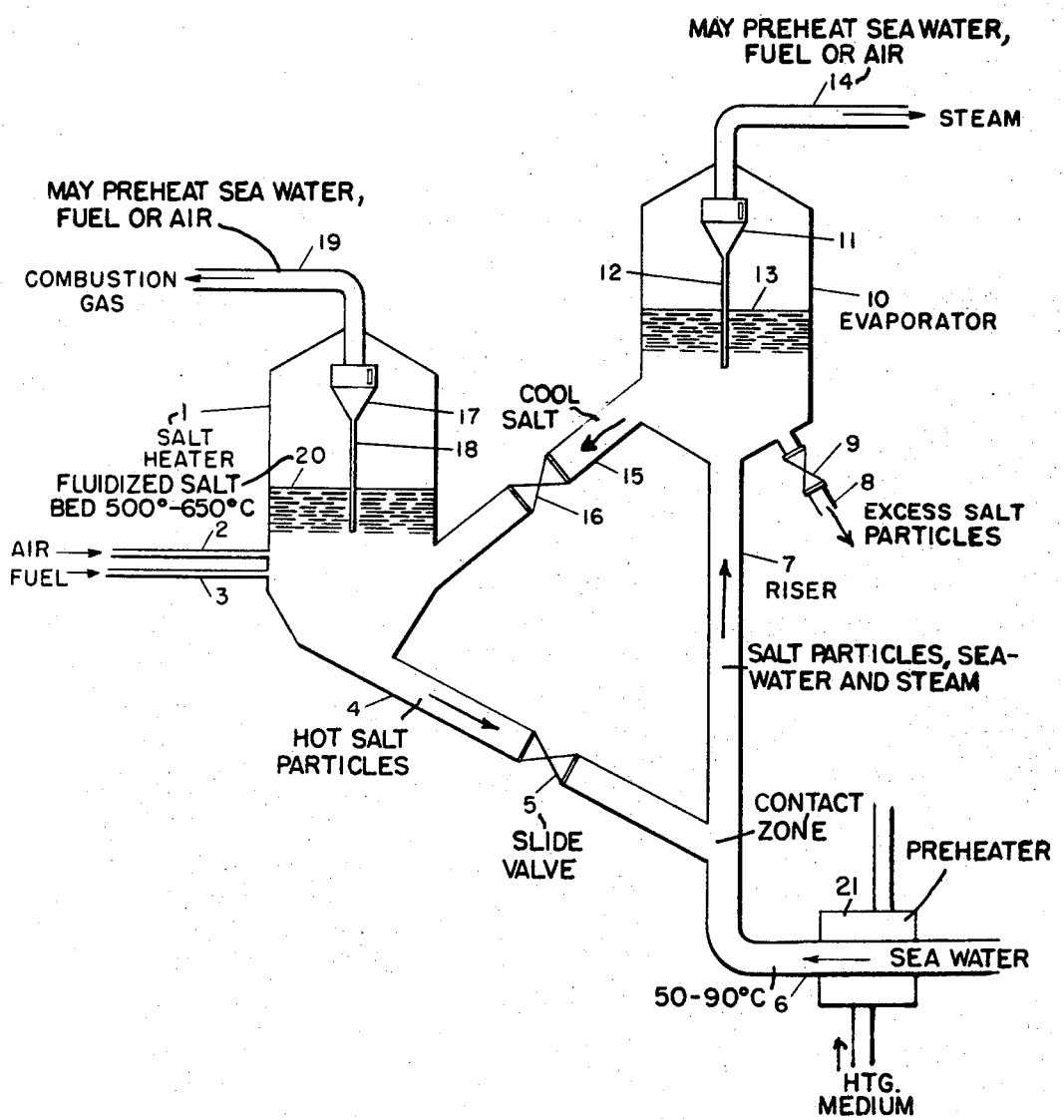

Charles L. Thomas, Swarthmore, Pa., assignor to Sun Oil Company, Philadelphia, Pa., a corporation of New Jersey
Filed May 6, 1966, Ser. No. 548,093
10 Claims. (Cl. 159—47)

The present invention relates to a fluidized mass process for desalination of sea water. More particularly, the invention relates to a process wherein sea water is contacted with a fluidized mass of hot salt particles so that the water is flash evaporated by contact with the fluidized mass whereby the salt in the sea water is deposited on the particles of the fluidized salt mass and the water passes off as steam.

A number of methods for desalination have been devised. These range from simple distillations to electric shock treatments.

In one widely used method called the multi-stage flash method, hot brine is passed through a series of compartments, each successive compartment having progressively lower pressure so that as the hot brine passes from compartment to compartment, it flashes into steam and is cooled on condensers.

In another method, salt water is subjected to freezing temperatures. The resulting ice crystals are pure water. The crystals are separated from the brine and allowed to melt.

In another method of treating salt water known as reverse osmosis, the water is made to pass through cellulose acetate membranes under pressure. The salt does not pass through the membrane and pure water is collected.

In still a further method, an electric current is passed through salt water causing the sodium and chloride in the salt to separate and thus leaving pure water to be drawn off.

Still another method employs a spray of molten metal passed into a pool of salt water causing the water to flash distilling off pure water.

Although, as indicated above, there are various modes of separating the dissolved salt from sea water, the most promising from both ease of operation and economy, is generally considered to be some type of distillation.

One problem that faces each of these methods is the removal or recovery of the salt produced by the evaporation of the water. In systems such as the multistage method described above, the salt tends to cause scales on the evaporating surfaces requiring frequent shutdowns for removal of this scale. Some novel methods have been devised to overcome this problem. One of these is an agitated bed of heated pebbles which serve as a heat transfer medium. Salt water is contacted with the hot pebbles and is flash evaporated. After the salt is deposited on the pebbles, the agitation breaks the salt scale allowing it to fall out of the reactor to a conveyer or some other means for removal.

An alternative to complete distillation of the salt water feed is partial distillation of the feed with the production of a highly concentrated brine which is removed thus reducing fouling of the desalination equipment. This method has the disadvantage of requiring the treatment of considerably larger quantities of salt water feed than recovered potable water.

The present invention overcomes the problem of salt and scale removal from a solution of salt in water and the fouling of desalination equipment by employing salt per se as the heat transfer medium. As the salt water contacts the hot fluidized mass of salt, the water is vaporized and the salt contained therein is deposited on the surface of the heated fluidized salt mass. In order to more fully explain the instant process, reference is hereby made to the figure which is a single embodiment of the invention and it is understood that the instant process can be carried out in any suitable fluidized bed reactor.

The fluidized technique is well known today and the term "fluidized mass" as employed herein is understood to mean a bed or mass of finely divided solid particles, in the instant case salt particles which have the appearance of a powder, which is contacted with a rising stream of process gas, in the instant case steam so that the solid particles are lifted and agitated. The solid particles after contact with the gas have a behavior in the range of boiling liquids to suspensions of the particles in the gas stream.

A discussion of fluidization and the variables and relationships therein can be found in Kirk and Othmer, Encyclopedia of Chemical Technology, First Supplement vol., Interscience Publishers, Inc., New York, 1957, pp. 365 to 400.

In the drawing:
The figure is a schematic representation of the process in typical apparatus for the process.

In the drawing a fluidized mass of salt, principally sodium chloride, having a particle size in the range of 0.01 to 1 millimeter is heated in salt heater 1 to a temperature in the range of 500–650° C. by the combustion of a suitable fuel such as oil or natural gas added through conduit 3 in admixture with air added through conduit 2. The hot salt particles flow to the evaporator 10 via conduit 4 through slide valve 5 which is used to control the rate at which the fluidized salt is circulated. Valve 5 controls the level of the fluidized mass of salt 13 in the evaporator 10. Usually most of the heat transfer will have occurred in riser 7 so that valve 5 can be open to the maximum extent except as necessary to control the back flow of combustion gases from salt heater 1 into evaporator 10. After the fluidized hot salt passes through valve 5 it enters the base of riser 7. At this point salt water enters riser 7 from conduit 6. The salt water may be added at ambient temperatures but is preferably preheated to temperatures in the range of 50 to 90° C. The salt water can be heated to high temperatures, preferably about 150° C. and sufficient pressure applied to maintain the water in liquid phase. When the salt water contacts the hot fluidized salt, there is an initial flash evaporation which causes sufficient turbulence to raise the hot fluidized mass of salt through riser 7 along with the steam generated thereby into evaporator 10. Because of the violent turbulence the temperature is quite uniform throughout the fluidized mass. The ratio of hot fluidized salt to injected water is in the range of 5 to 20 pounds of hot salt per pound of water. As the salt water is rapidly vaporized, its salt and scale content is deposited on the fluidized salt mass. As a result of the vaporization, the salt is cooled to the temperature in the range of 125–200° C.

The cooled fluidized salt mass is withdrawn from the evaporator 10 via line 15 through slide valve 16 into salt heater 1 wherein the process is repeated. The steam produced by the contacting of the salt water and the hot fluidized mass of salt passes into cyclone separator 11 where entrained salt particles are separated and returned via pipe 12 to a point below the fluidized salt mass level 13. The steam passes out of cyclone separator 11 through conduit 14 and may be passed through a series of cyclone separators or an electro-static precipitator for example to remove any further entrained salt particles. Steam produced in the present process may be passed through a steam turbine to generate electric power and then condensed or may be used to preheat the salt water feed, the fuel feed or the air. The combustion gases (flue gas)

produced in salt heater 1 pass into cyclone separator 17 where entrained salt particles are separated and returned by pipe 18 to a point below the level of the salt heater fluidized salt mass 20. The combustion gases pass out through conduit 19 and may be subjected to further separation to remove entrained salt particles, and subsequently may be used to preheat the salt water feed, the fuel feed or the air.

Unlike most processes employing fluidized solids, instead of a decrease in fluidized bed volume, there is an increase in the fluidized salt bed volume because of the deposition of the salt from the salt water onto the particles of the fluidized mass. As a result, evaporator 10 is provided with valve 9 and conduit 8 by which the salt may be withdrawn from the system. The salt withdrawn through valve 9 and conduit 8 as well as that separated by subsequent means from the steam and combustion gases may be removed by conveyers or any other convenient manner. Because of the accretion to the salt particles of the fluidized mass from the salt water the size of the particles tends to remain constant even though there is considerable attrition from the turbulence in the system.

As an alternative to the generation of the hot gases in the salt heater 1 they may be generated outside of the salt heater 1 for example in a Dutch oven, turbo-compressor, jet engines such as those used in airplanes which would serve as both compressor and heater or by nuclear reactor wherein circulating gas is heated and passed through the salt heater then returned to the nuclear reactor for reheating.

In order to obtain optimum equipment life, it is preferable that the metal parts that otherwise would be exposed during the process be lined with refractories such as Gunited high temperature concrete or castable refractory to protect the metal from corrosion and high temperatures. The principal advantages of the instant invention over prior processes for the production of potable water are that the volume of water handled is only slightly larger than the potable water produced in contrast to conventional processes which reject a concentrated brine and so must process far larger volumes than the volume of potable water produced. Further, the scaling of heat transfer surfaces is avoided since the solids dissolved in the salt water are deposited directly onto the fluidized salt bed which is ultimately recycled or disposed if.

It is readily apparent that most existing fluidized bed systems can be adapted for operation in the instant process. Control of the various rates of solids flow and salt water flow depend to a great extent on the temperature of operation and the degree of turbulence desired in the fluidized mass. The operation of fluidized beds is well known in the art and it is within the ability of those skilled in the art to choose those particular conditions which are most suited for particular apparatus. Moreover having arbitrarily selected a value for one variable, the selection of other variables will be interdependent thereon.

It is also readily apparent that the instant process is also a method of producing salt in large quantities and a desirable form, i.e., a fine powder.

The invention claimed is:
1. The method of desalinating sea water comprising heating a fluidized mass of salt particles with heated gases, conveying a portion of the heated particles to the bottom of a riser zone where said heated particles directly impinge a stream of sea water, the combined steam of salt and water ascending in the riser zone and the heated salt evaporating the water, discharging the relatively cooled and moist salt into a drying bed of said salt from which a dried portion is withdrawn and conveying by gravity, another portion of the drying bed salt to the fluidized mass of salt particles for reheating.

2. The method of desalination according to claim 1 wherein the fluidized mass of salt particles is heated to a temperature in the range of 500–650° C.

3. The method of desalination according to claim 2 wherein the heated fluidized mass of salt particles is recovered after the contacting.

4. The method of desalination according to claim 2 wherein the water is recovered.

5. The method of desalination according to claim 2 wherein the fluidized bed of salt has a particle size in the range of 0.01 to 1 millimeter.

6. The method of desalination according to claim 2 wherein the weight ratio of the fluidized bed of salt to the solution of injected sea water is in the range of 5:1 to 20:1 on the basis of weight.

7. The method of desalination according to claim 2 wherein the solution of sea water is heated prior to the contacting to a temperature in the range of 50–90° C.

8. The method of desalination according to claim 2 wherein a portion of the fluidized mass of salt particles is removed.

9. The method of desalination according to claim 3 wherein the temperature of the recovered fluidized mass of salt particles is in the range of 125–200° C.

10. The method of desalination according to claim 9 wherein the recovered fluidized mass of salt particles is heated to a temperature in the range of 500–650° C. and recycled.

References Cited

UNITED STATES PATENTS

| | | | |
|---|---|---|---|
| 2,475,984 | 7/1949 | Owen | 34—10 |
| 2,561,394 | 7/1951 | Marshall | 117—100 |
| 2,635,684 | 4/1953 | Joscelyne | 159—48 |
| 2,755,749 | 7/1956 | Seymour | 110—7 |
| 2,928,184 | 3/1960 | Lonngren | 34—10 |
| 2,797,981 | 7/1957 | Tooke | 23—96 |
| 2,949,447 | 8/1960 | Hawkins et al. | 260—93.7 |
| 2,567,959 | 9/1951 | Munday | 159—4 |

FOREIGN PATENTS 620,035  5/1961  Canada.

NORMAN YUDKOFF, *Primary Examiner.*

J. SOFER, *Assistant Examiner.*